(12) United States Patent
Nam et al.

(10) Patent No.: US 9,811,606 B2
(45) Date of Patent: Nov. 7, 2017

(54) SEARCH SYSTEM AND METHOD OF PROVIDING VERTICAL SERVICE CONNECTION

(71) Applicant: NAVER CORPORATION, Seongnam-Si, Gyeonggi-Do (KR)

(72) Inventors: Chan Woo Nam, Seongnam-si (KR); Chan Il Kim, Seongnam-si (KR); Hyun Soo Kim, Seongnam-si (KR)

(73) Assignee: NAVER CORP., Gyeonggi-Do (KR)

( * ) Notice: Subject to any disclaimer, the term of this patent is extended or adjusted under 35 U.S.C. 154(b) by 218 days.

(21) Appl. No.: 14/481,125

(22) Filed: Sep. 9, 2014

(65) Prior Publication Data
US 2015/0074138 A1 Mar. 12, 2015

(30) Foreign Application Priority Data

Sep. 12, 2013 (KR) .......................... 10-2013-0109970

(51) Int. Cl.
*G06F 17/30* (2006.01)
(52) U.S. Cl.
CPC .... *G06F 17/3097* (2013.01); *G06F 17/30864* (2013.01)
(58) Field of Classification Search
CPC .............................................. G06F 17/30864
USPC ....................... 707/767, 740, 803
See application file for complete search history.

(56) References Cited

U.S. PATENT DOCUMENTS

| 7,516,124 | B2 | 4/2009 | Kasperski |
| 2007/0219954 | A1 | 9/2007 | Ray et al. |
| 2007/0244863 | A1 | 10/2007 | Adams et al. |
| 2010/0057698 | A1* | 3/2010 | Prasad Kantamneni .......................... G06F 17/3097 707/E17.015 |
| 2010/0076947 | A1* | 3/2010 | Kurapat ............ G06F 17/30864 707/706 |

(Continued)

FOREIGN PATENT DOCUMENTS

| JP | 2009-530708 A | 8/2009 |
| JP | 2011-134160 A | 7/2011 |

(Continued)

OTHER PUBLICATIONS

Office Action for corresponding Korean Patent Application No. 10-2013-0109970 dated Sep. 26, 2014.

(Continued)

*Primary Examiner* — Chelcie Daye
(74) *Attorney, Agent, or Firm* — Harness, Dickey & Pierce, P.L.C.

(57) ABSTRACT

A search system for providing a vertical service connection includes a search word completing unit configured to determine, upon receiving a search word from a user terminal, at least one auto-complete search word corresponding to a currently input search word; a search word matching unit configured to match the at least one auto-complete search word with a vertical service; a display unit configured to cause the display of the at least one auto-complete search word and a vertical service icon; and a vertical service searching unit configured to provide, upon receiving a selection signal indicating selection of the vertical service icon, results of searching content included in the matched vertical service for the at least one auto-complete search word.

20 Claims, 7 Drawing Sheets

(56) References Cited

U.S. PATENT DOCUMENTS

| | | | |
|---|---|---|---|
| 2010/0076979 A1* | 3/2010 | Wang | G06F 17/30864 707/740 |
| 2010/0146012 A1* | 6/2010 | Beaudreau | G06F 17/30648 707/803 |
| 2010/0281012 A1 | 11/2010 | Imig et al. | |

FOREIGN PATENT DOCUMENTS

| | | |
|---|---|---|
| JP | 2012-501499 A | 1/2012 |
| JP | 2012-164353 A | 8/2012 |
| KR | 2010-0031912 A | 3/2010 |
| KR | 2011-0099225 A | 9/2011 |
| WO | WO-2007/135845 A1 | 11/2007 |
| WO | WO-2010-065260 A2 | 6/2010 |
| WO | WO-2010-065260 A3 | 8/2010 |

OTHER PUBLICATIONS

Office Action for corresponding Japanese Patent Application No. 2014-179915 dated Aug. 4, 2015.

\* cited by examiner

| SERVICE NAME | ASSIGNED SEARCH WORD |
|---|---|
| FIRST VERTICAL SERVICE | a, b, c, d |
| SECOND VERTICAL SERVICE | x, y, z |
| THIRD VERTICAL SERVICE | l, m, n, a |

SEARCH SYSTEM AND METHOD OF PROVIDING VERTICAL SERVICE CONNECTION

RELATED APPLICATION

This application claims the benefit of Korean Patent Application No. 10-2013-0109970, filed on Sep. 12, 2013, in the Korean Intellectual Property Office, the disclosure of which is incorporated herein in its entirety by reference.

BACKGROUND

1. Field

One or more example embodiments relate to a search system and method of providing a vertical service connection.

2. Description of the Related Art

The amount of on-line information is increasing exponentially according to the development of network environments. A search service provides information desired by a user from among a massive amount of on-line information, and generally, a link of a web page matching a search word is provided to the user when the user inputs the search word. Recently, in addition to simply searching for a web page matching a search word, search algorithms that rank desired information for a user are being developed.

However, despite the development of search algorithms, it is difficult to establish standards for determining which one of search results is to be given a higher rank since it may be difficult to determine an intention of a user by only using a list of search words. Also, a rapid increase in an amount of on-line information may correspond with a rise in an amount of unprofessional and unverified information. Accordingly, it may be difficult for a search service provider to guarantee the reliability of search results.

Recently, specialized vertical service platforms, such as vertical social commerce and a vertical social network service (SNS), appeared to satisfy diverse and segmentalized needs of at least some users. The terms 'vertical platform' and 'vertical service' are common terms for a service that provides content which is specialized in a certain category.

Besides a service provided by the vertical platform, a section service provided according to categories by a large platform, such as a portal site, may also be a vertical service. The vertical service provided by the large platform may satisfy needs of users who want to obtain certain information since filtered, accurate and segmentalized information may be provided. As a search market advances, a portal is changing from a simple web page link provider to an information supplier.

SUMMARY

At least some example embodiments are directed to a system and method for a search service that meets needs of a user, and more particularly, a search system and method of providing information of a vertical service that meets needs of a user without the user having to input data several times while using a search service in a mobile terminal.

According to one or more example embodiments, a search system for providing a vertical service connection includes a search word completing unit configured to determine, upon receiving a search word from a user terminal, at least one auto-complete search word corresponding to a currently input search word input; a search word matching unit configured to match the at least one auto-complete search word with a vertical service; a display unit configured to cause the display of the at least one auto-complete search word and a vertical service icon; and a vertical service searching unit configured to provide, upon receiving a selection signal indicating selection of the vertical service icon, results of searching content included in the matched vertical service for the at least one auto-complete search word.

The display unit may be configured to cause the display of an auto-complete search window having n rows at one side of a search window, cause the display of the at least one auto-complete search word at a first side of each of the n rows, and cause the display of a vertical service icon matched with the at least one auto-complete search word at a second side of each of the n rows, wherein n is a natural number.

The search word completing unit may be configured to determine a priority of the at least one auto-complete search word in a descending order of search frequency, and the display unit may be configured to display the at least one auto-complete search word on a row of the auto-complete search window according to the priority such that a row upon which the at least one auto-complete search word is displayed when the priority is high is higher than a row upon which the at least one auto-complete search word is displayed when the priority is low.

A number of vertical service icons displayed at the second side may be at least one.

An auto-complete search word displayed on a first row of the auto-complete search window may be the currently input search word.

The search word matching unit may be configured to match the at least one auto-complete search word with a vertical service having an assigned search word matching with the at least one auto-complete search word.

The search system may further include a unified searching unit configured to, upon receiving an auto-complete search word selection, provide results of searching for the at least one auto-complete search word via a unified search.

The search system may further include a vertical service managing unit configured to receive a list of vertical services from a manager terminal, the vertical service managing unit being further configured to manage the list of vertical services, contents included in the vertical services, and an assigned search words corresponding to each of the vertical services, respectively.

The vertical service searching unit may be configured to provide search results by ranking manager registration content such that the manager registration content has higher priority compared to other content from among the contents included in the vertical services received from the manager terminal.

According to one or more example embodiments, a search method of providing a vertical service connection includes determining at least one auto-complete search word corresponding to a search word received from a user terminal, wherein the determining is performed by a search word completing unit; matching the at least one auto-complete search word with a vertical service, wherein the matching is performed by a search word matching unit; causing display of the at least one auto-complete search word and a vertical service icon, wherein the causing display is performed by a display unit; and providing, upon receiving a selection signal of the vertical service icon, results of searching content included in the matched vertical service for the at least one auto-complete search word, wherein the providing is performed by a vertical service searching unit.

The causing display may include causing display of an auto-complete search window having n rows at one side of a search window, causing display of the at least one auto-complete search word at a first side of each of the n rows, and causing display of the vertical service icon at a second side of each of the n rows, wherein n is a natural number.

The determining may include determining a priority of the at least one auto-complete search word in a descending order of search frequency, and the displaying may include displaying the at least one auto-complete search word on an upper row of the auto-complete search window according to the priority such that a row upon which the at least one auto-complete search word is displayed when the priority is high is higher than a row upon which the at least one auto-complete search word is displayed when the priority is low.

A number of vertical service icons displayed at the second side may be at least one.

An auto-complete search word displayed on a first row of the auto-complete search window may be a currently input search word.

The matching may include matching the at least one auto-complete search word with a vertical service having an assigned search word matching with the at least one auto-complete search word.

The search method may further include, upon receiving an indication of a selection of the auto-complete search word, providing results of searching for the at least one auto-complete search word via a unified search, wherein the providing is performed by a unified searching unit.

The search method may further include receiving a list of vertical services from a manager terminal; and managing the list of vertical services, contents included in the vertical services, and assigned search words corresponding to each of the vertical services, respectively, wherein the receiving is performed by a vertical service managing unit.

The providing may include providing search results by ranking manager registration content such that the manager registration content has higher priority compared to other content from among the contents included in the vertical services received from the manager terminal.

According to one or more example embodiments, a non-transitory computer-readable recording medium may have recorded thereon a program including instructions that, when executed by a processor, cause the processor to perform operations of a search method, the operations including determining at least one auto-complete search word corresponding to a search word received from a user terminal, wherein the determining is performed by a search word completing unit; matching the at least one auto-complete search word with a vertical service, wherein the matching is performed by a search word matching unit; causing display of the at least one auto-complete search word and a vertical service icon, wherein the causing display is performed by a display unit; and providing, upon receiving a selection signal of the vertical service icon, results of searching content included in the matched vertical service for the at least one auto-complete search word, wherein the providing is performed by a vertical service searching unit.

According to one or more example embodiments, a search device includes a processing unit, the processing unit including a processor, the processing unit being configured to implement, a search word completing unit configured to, receive search text from a user device, and determine at least one auto-complete search word corresponding to the received search text; a search word matching unit configured to select one or more vertical services from among a plurality of vertical services, the selected one or more vertical services being vertical services that correspond to the at least one auto-complete search word; a display unit configured to cause the user device to display the at least one auto-complete search word and one or more vertical service icons, the one or more vertical service icons corresponding, respectively, to the selected one or more vertical services; and a vertical service searching unit configured to, receive, from the user device, an indication indicating selection of a vertical service icon from among the one or more displayed vertical service icons, search content included in a first vertical service for the at least one auto-complete search word, the first vertical service being a vertical service to which the selected vertical service icon corresponds, from among the selected one or more vertical services, and provide results of the search to the user device.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1A:
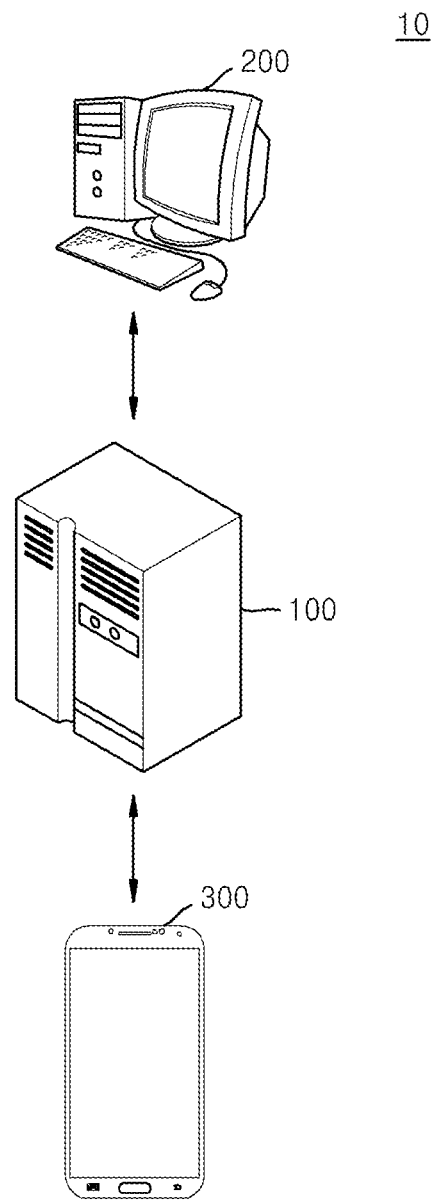
FIG. 1A is a diagram of a structure of a search system according to at least one example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein. Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are described herein with reference to schematic illustrations of idealized embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Hereinafter, one or more example embodiments will be described in detail with reference to accompanying drawings, to be easily executed by one of ordinary skill in the art.

FIG. 1A is a diagram of a structure of a search system 10 according to at least one example embodiment.

Referring to FIG. 1A, according to one or more example embodiments, the search system 10 includes a service providing server 100, a manager terminal 200, and a user terminal 300.

The service providing server 100 according to at least one example embodiment is a server that provides a search result upon receiving a search word from a user, and may be a server providing a portal service. For example the service providing sever 100 may be, for example, a web server configured to provide data including, for example, web pages and services in response to requests from clients and/or users. For example, the service providing server 100 may be a web server for a web portal, the web portal being an online service that provides users with information corresponding to a plurality of sources and/or topics in a uniform and accessible manner. Although only one service providing server 100 is shown in FIG. 1A, a plurality of the service providing servers having the structure and operation described herein with respect to the service providing server 100 may be included in the search system 10 according to a traffic amount or a data amount.

The service providing server 100 may provide various services that increase user convenience, as well as a general search service. In other words, the service providing server 100 according to at least one example embodiment may provide, as well as a search service, various services, such as providing emails, news, or shopping information.

The service providing server 100 according to at least one example embodiment may provide a plurality of vertical services. As used herein, a vertical service is a service that provides information that is specialized in a certain category. According to one or more example embodiments, The service providing server 100 may provide not only information uploaded by an individual to the vertical service, but also information input through the manager terminal 200 and verified by a manger, including for example a person who manages one or more of the plurality of vertical services. As will be discussed in greater detail below with reference to FIG. 2, each vertical search service may be assigned to a particular topic or sub-topic. Thus, according to one or more example embodiments, the service providing server 100 may implement each vertical service by acquiring and storing, for each vertical service, information corresponding to the topic of the vertical service. Accordingly, each vertical service may include the information acquired by the service providing server 100 for the vertical service. The vertical service provided by the service providing server 100 according to at least one example embodiment may be a specialized service meeting needs of a user, such as information about, or access to, movies, music, dictionaries, comics, cars, weather, news, and shopping. A list of service types which may be provided to a user by the service providing server 100 may expand substantially or, alternatively, limitlessly over time.

The manager terminal 200 is a terminal for inputting control commands and various types of contents to the service providing server 100 under a wired or wireless communication environment. For example, the manager terminal 200 and the service providing server 100 may transmit information to one another via one or more wired or wireless data connections between the manager terminal 200 and the service providing server 100.

The user terminal 300 may be any device by which a user may access a search service provided by the service providing server 100. For example, the user terminal 300 may be an electronic device example of which include, but are not limited to, a mobile device, a smart phone, a tablet, a laptop, and a desktop computer. For example, the user terminal 300 is illustrated in FIG. 1A as a smart phone. For example, the user terminal 300 may be a smart phone on which a web browser application for using a search service provided by the service providing server 100 is mounted. A user may use a search service according to at least one example embodiment by using the user terminal 300. Although the user terminal 300 of FIG. 1A is illustrated as a smart phone, according to one or more example embodiments, the user terminal 300 may be any device on which an application capable of web browsing is mounted. The user terminal 300 and the service providing server 100 may communicate with one another through one or more wired or wireless connections between the user terminal 300 and the service providing server 100. For example, the user terminal 300 may receive data from, and provide data to, the service providing server 100 via a wireless data interface including, for example, one or more of a wireless Ethernet network (e.g., WiFi) and a cellular communications network.

Figure 1B:
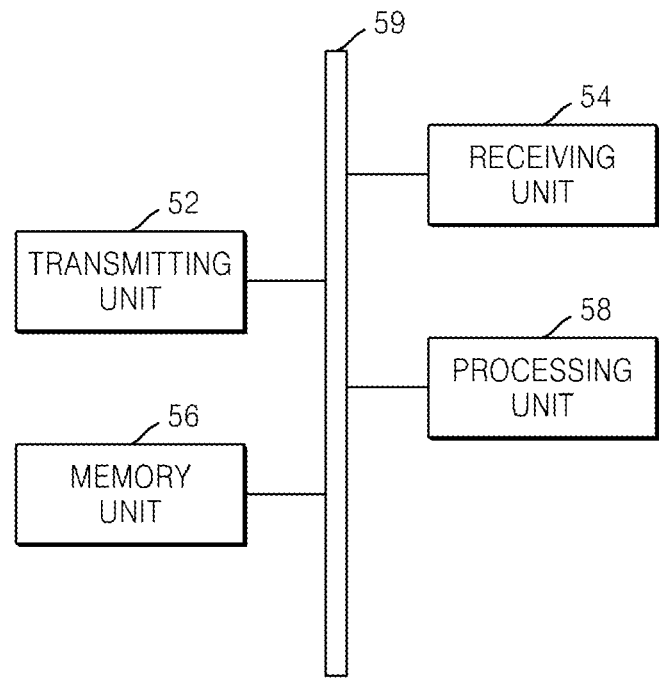
FIG. 1B is a diagram illustrating an example structure of the electronic device 50 according to at least one example embodiment.

FIG. 1B is a diagram illustrating an example structure of the electronic device 50. Any of the service providing server 100, the management terminal 200, and the user device 300 may have the structure and operation of the electronic device 50 described below. For example, the service providing server 100, the management terminal 200, and the user device 300 may all be implemented, respectively, by electronic devices having the structure and operating in the same manner as that described for the electronic device 50 with reference to FIG. 1B. Referring to FIG. 1B, the electronic device 50 may include, for example, a data bus 59, a transmitting unit 52, a receiving unit 54, a memory unit 56, and a processing unit 58.

The transmitting unit 52, receiving unit 54, memory unit 56, and processing unit 58 may be connected to one another via the data bus 59. The transmitting unit 52, receiving unit 54, memory unit 56, and processing unit 58 may send data to and/or receive data from one another using the data bus 59.

The transmitting unit 52 is a device that includes hardware and any necessary software for transmitting signals including, for example, control signals or data signals via one or more wired and/or wireless connections to other network element.

The receiving unit 54 is a device that includes hardware and any necessary software for receiving wireless signals including, for example, control signals or data signals via one or more wired and/or wireless connections to other network elements.

The memory unit 56 may be any device capable of storing data including magnetic storage, flash storage, etc.

The processing unit 58 may be any device capable of processing data including, for example, a processor. The term 'processor', as used herein, refers to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multiprocessor, an application-specific integrated circuit (ASIC), and a field programmable gate array (FPGA).

According to at least one example embodiment, any operations described herein, for example with reference to any of FIGS. 1-8, as being performed by any of the service providing server 100, the management terminal 200, and the user device 300, may be performed by an electronic device having the structure of the electronic device 50 illustrated in FIG. 1B. For example, according to at least one example embodiment, the electronic device 50 may be programmed, in terms of software and/or hardware, to perform any or all of the functions described herein as being performed by any of the service providing server 100, the management terminal 200, and the user device 300. Consequently, each of the service providing server 100, the management terminal 200, and the user device 300 may be embodied as special purpose computers.

Examples of the electronic device 50 being programmed, in terms of software, to perform any or all of the functions described herein as being performed by any of the service providing server 100, the management terminal 200, and the user device 300 will now be discussed below. For example, the memory unit 56 may store a program including executable instructions corresponding to any or all of the operations described with reference to FIGS. 1-8 as being performed by the service providing server 100, the management terminal 200, or the user device 300. According to at least one example embodiment, additionally or alternatively to being stored in the memory unit 56, the executable instructions may be stored in a computer-readable medium including, for example, an optical disc, flash drive, SD card, etc., and the electronic device 50 may include hardware for reading data stored on the computer readable-medium. Further, the processing unit 58 may be a processor configured to perform any or all of the operations described with reference to FIGS. 1-8 as being performed by the service providing server 100, the management terminal 200, or the user device 300, for example, by reading and executing the executable instructions stored in at least one of the memory unit 56 and a computer readable storage medium loaded into hardware included in the electronic device 50 for reading computer-readable mediums.

Examples of the electronic device 50 being programmed, in terms of hardware, to perform any or all of the functions described herein as being performed by the service providing server 100, the management terminal 200, or the user device 300 will now be discussed below. Additionally or alternatively to executable instructions corresponding to the functions described with reference to FIGS. 1-8 as being performed by a network element being stored in a memory unit or a computer-readable medium as is discussed above, the processing unit 58 may include a circuit that has a structural design dedicated to performing any or all of the operations described with reference to FIGS. 1-8 as being performed by the service providing server 100, the management terminal 200, or the user device 300. For example, the above-referenced circuit included in the processing unit 58 may be a FPGA or ASIC physically programmed to perform any or all of the operations described with reference to FIGS. 1-8 as being performed by the service providing server 100, the management terminal 200, or the user device 300.

Figure 2:
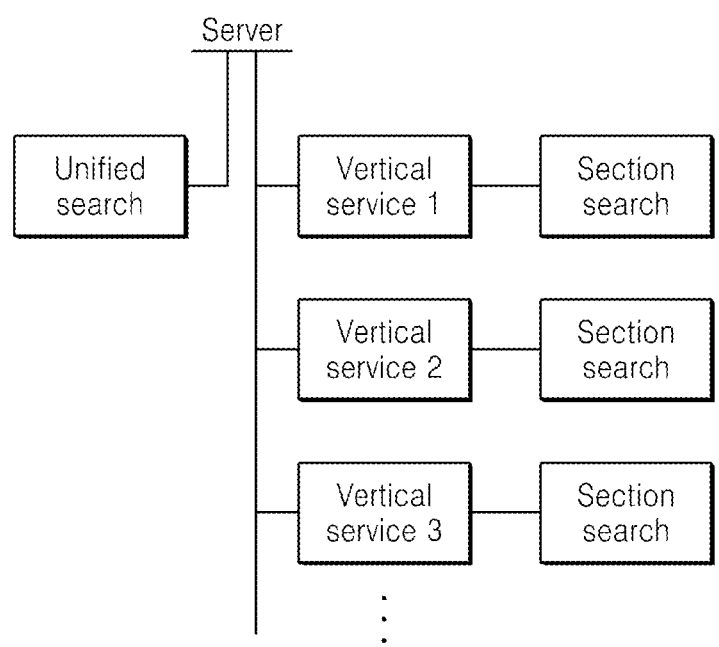
FIG. 2 is a diagram of a service provided by a service providing server shown in a tree structure, according to at least one example embodiment.

FIG. 2 is a diagram of a service provided by the service providing server 100 shown in a tree structure, according to at least one example embodiment.

As described above, the service providing server 100 according to at least one example embodiment may be a portal server that provides user convenience by integrating various services and providing access to the integrated services via the internet using, for example a web page or web portal.

The service providing server 100 provides a unified search service, and may provide a plurality of vertical services that are divided according to needs or interests of users. For example, the vertical services offered by the service providing server 100 may be assigned, respectively, to topics according to user interests including, for example, broad topics example of which include movies, music, comics, and news. The vertical services may also be assigned, respectively, to sub topics within broader topics including, for example, genres of music, or manufacturers of cars. The service providing server may provide the plurality of vertical services along with a plurality of section search services such that a user can use each section search service perform a search that is focused on the topic or sub topic of the vertical service that corresponds to the section search service. Due to a substantial increase in an amount of on-line information, it may be more desirable to implement a search system that prioritizes a feature of using a ranking algorithm that gives higher ranks to search results that are more likely to meet the desires and/or needs of a user, over providing abundant search results. Accordingly, unlike a unified search, a section search provided by a vertical service may rank information such that the highest or higher ranks are provided to search results that correspond to the topic of the vertical service corresponding to the section search. According to one or more example embodiments, a unified search is a search that is not limited to searching pages related only to a particular topic, and ranks search results in accordance with frequency of an occurrence of the search term in the different web pages included in the search results, for example, regardless of the topics to which the different web pages are directed. For example, when a user searches for 'Polo' via a unified search, a web page having a highest appearance frequency of 'Polo' may be ranked higher than web pages that include the term 'Polo' less. However, when the user searches for 'Polo' via a section search in a car vertical service (i.e., a vertical service assigned to the topic of cars), a web page detailing price and fuel efficiency information of a car whose model name is 'Polo' may be ranked higher than another web page that does not include information relating to a 'Polo' model car, even if the other web page includes many uses of the term 'Polo' with respect to a topic of topics other than cars.

Also, a manager may apply filtering to organize information returned by section searches of different vertical services, for example, through the manger terminal 200. Accordingly, the vertical service provided by the service providing server 100 according to at least one example embodiment may provide information organized by the manager via filtering, thereby allowing a user to obtain detailed information about the car 'Polo' that was filtered by a manager.

Some earlier search services only provided a link of a website including a search word as a search result. However, a portal site may be capable of providing a directly registered information page. An example of such a search service includes a person search. In the person search, a portal site directly provides information about a person after checking the information since it is difficult to obtain details organized in personal web pages and such details may be unreliable. Thus, the user may obtain highly reliable organized information by using a person search service provided by the portal site. The person search service is also a type of a vertical service.

In order to obtain content of such a vertical service as a search result, a method described below with reference to FIGS. 3A and 3B may be used.

Figure 3A:
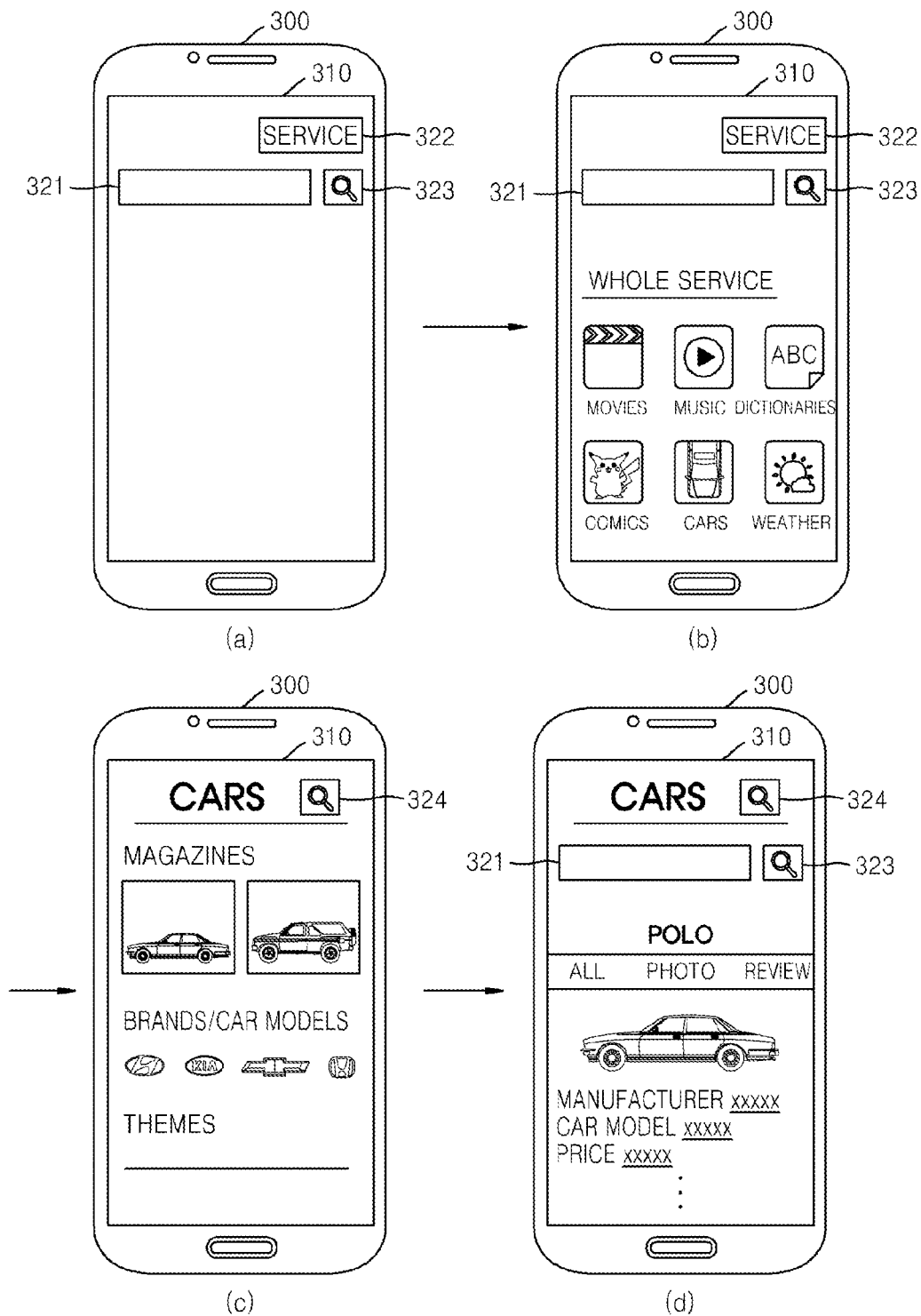
FIGS. 3A and 3B are diagrams for describing a method of searching, by a user, content of a vertical service, according to one or more example embodiments.
Figure 3B:
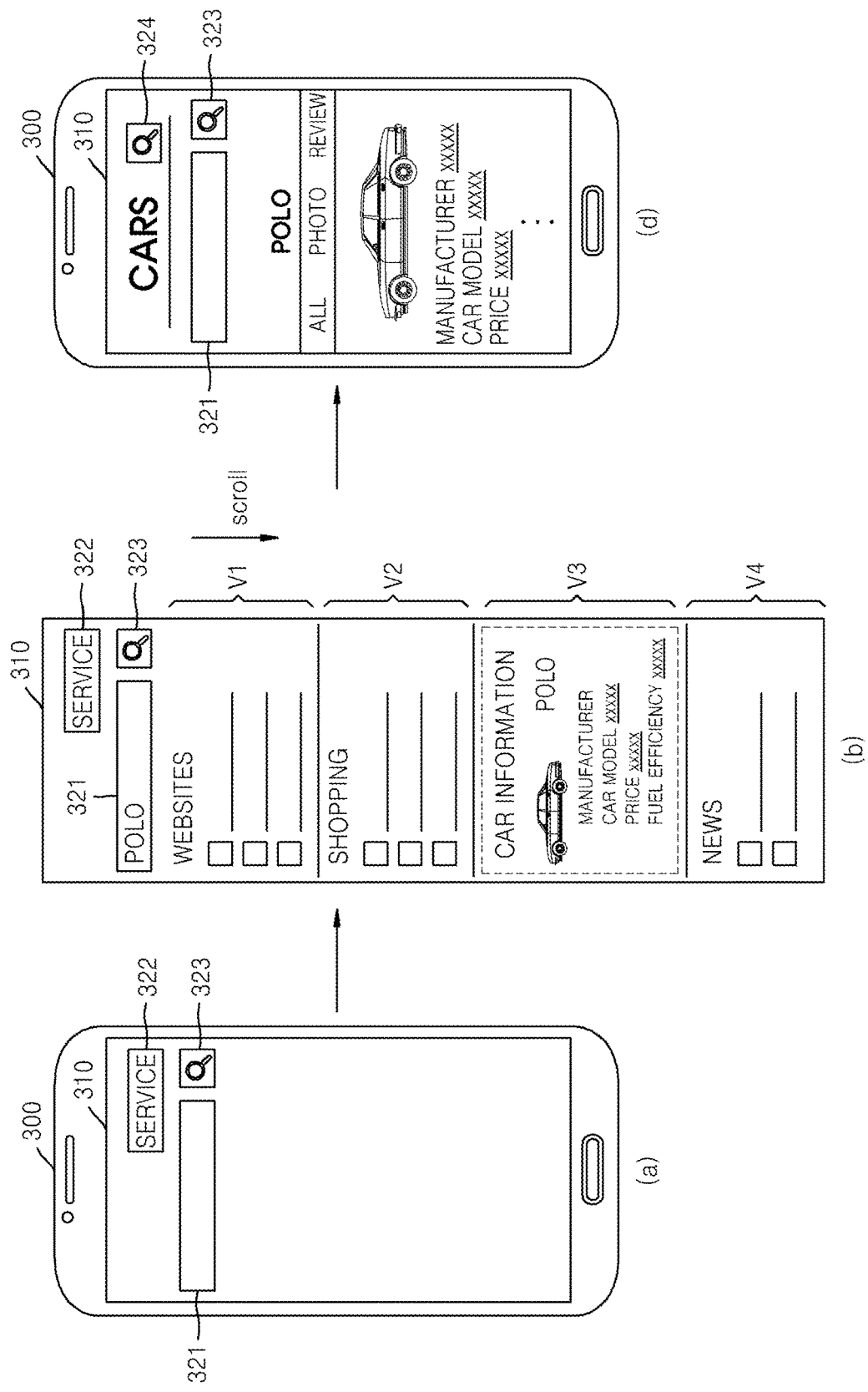

FIGS. 3A and 3B are diagrams for describing a method of searching, by a user, content of a vertical service, according to one or more example embodiments.

FIGS. 3A and 3B are illustrated with reference to an example in which a user performs searching on a mobile terminal, but alternatively, the searching may be performed on any other type of user terminal. Referring to FIGS. 3A and 3B, the user terminal 300 includes a display screen 310 that displays a search system according to at least one example embodiment.

FIG. 3A is a diagram for describing the method using a section search of a vertical service.

Referring to FIG. 3A, item (a), the user device 300 may first display a basic screen, for example, when the service providing server 100 and the user device 300 establish a connection through which to exchange data with each other. The basic screen includes a search window 321, a service open button 322, and a search button 323. The search window 321 is an input space for inputting, by a user, a search word. According to one or more example embodiments, the user may input the search word into the search window 321 using one or more input devices, including, for example, a keyboard, a keypad, a touch screen, and a microphone for voice input. For example, the user may input the search word into the search window 321 and indicate a search execution command, for example by selecting the search button 323 or issuing a verbal command, to obtain a search result with respect to the input search word. When the search word is input in the basic screen of FIG. 3A, item (a), the search result is provided via a unified search service, and thus the user does not have to perform a separate operation to search content in a vertical service.

The user may select the service open button 322 to display a vertical service list as shown in FIG. 3A, item (b). Referring to FIG. 3A, item (b), the vertical service list includes, for example, vertical services for the topics of movies, music, news, comics, cars, and weather, but is not limited thereto and may include vertical services for other topics.

FIG. 3A, item (b) illustrates a user selecting a vertical service matching content to be searched. For example, when the user wants to obtain information about a car whose product name is 'Polo', the user may select a vertical service assigned to the topic of cars.

FIG. 3A, item (c) illustrates a home screen of the car vertical service displayed by the user device 300 when the user selects the car vertical service. The home screen of the car vertical service may display news or important information related to a subject of a current vertical service.

FIG. 3A, item (c) illustrates a screen that the user may use to select a section search button 324 to cause the search window 321 to pop-up as shown in FIG. 3A, item (d). The user may then input a search word and select the search button 323 to search content in the car vertical service that is assigned the topic of cars. According to one or more example embodiments, as shown in FIG. 3A, item (d), information output via the section search corresponding to the car vertical service may contain search results of searching only the content of the car vertical service. According to one or more example embodiments, the section search corresponding to the car vertical service may return, as results, only information included in the car vertical search service. For example, the section search corresponding to the car vertical service may return, as results, only information that relates to the topic of cars.

FIG. 3B is a diagram for describing a process of selecting a search result of a vertical service in a unified search.

In a basic screen shown in FIG. 3B (a), the user may input a search word into the search window 321 and select the search button 323 to obtain unified search results. Alternatively, the user may input the search word into the search window 321 and press an enter key or issue a voice command to obtain the unified search results.

FIG. 3B, item (b) illustrates an example of the unified search results. Referring to FIG. 3B, item (b), a region V1 shows general website search results, but regions V2 through V4 show search results according to vertical services. As described above, the general website search results display links of web pages in a descending order of appearance frequency of the search word, but vertical service search results may not only adjust rankings of search results according to individual characteristics of vertical services, but may also directly display information provided by the manager terminal 200 instead of providing only a general link.

For example, when the user performs a unified search by using 'Polo' as a search word, vertical services related to 'Polo' may be displayed in the regions V2 through V4. The region V2 provides search results of a shopping vertical service, the region V2 provides search results of a car vertical service, and the region V4 provides search results of a news vertical service. Links of shopping websites may be provided as 'Polo' shopping search results as shown in the shopping vertical service, but alternatively, information registered by a manager may be directly displayed as search results as shown in the car vertical service.

The user may obtain a detailed result with respect to the search word by clicking one of links displayed as the search results of each vertical service. For example, the user may select a link of the car vertical service in the region V3 of FIG. 3B, item (b) to obtain a detailed result with respect to the search word in the car vertical service as shown in FIG. 3B, item (c).

By using the method described above with reference to FIGS. 3A and 3B, the user has to additionally click links several times compared to the unified search to connect to a vertical service, and thus user accessibility is low. Thus, according to at least one example embodiment, a user interface (UI) supporting a vertical service connection when a search word is input is provided, for example, through a data connection between the service providing server 100 and the user device 300 as is discussed in greater detail below. For example, according to one or more example embodiments, the screens described herein as being shown on the display 310 of the user device 300, including the screens illustrated in FIGS. 3A, 3B, 6 and 7, are UIs provided in the form of web pages to the user device 300 by the service providing server 100, for example, in response to search queries entered by a user via the user device 300 and received at the service providing server 100 from the user device 300. For example, in response to receiving a search query from the user device 300, the service providing server 100 may generate search results, include the search results in code defining a web page or a user interface (UI), and transmit, through a data connection between the service providing server 100 and the user device 300, the code defining the web page or UI to the user device 300 for display on the display 310 of the user device 300 as a web page or UI.

Figures 4, 5:
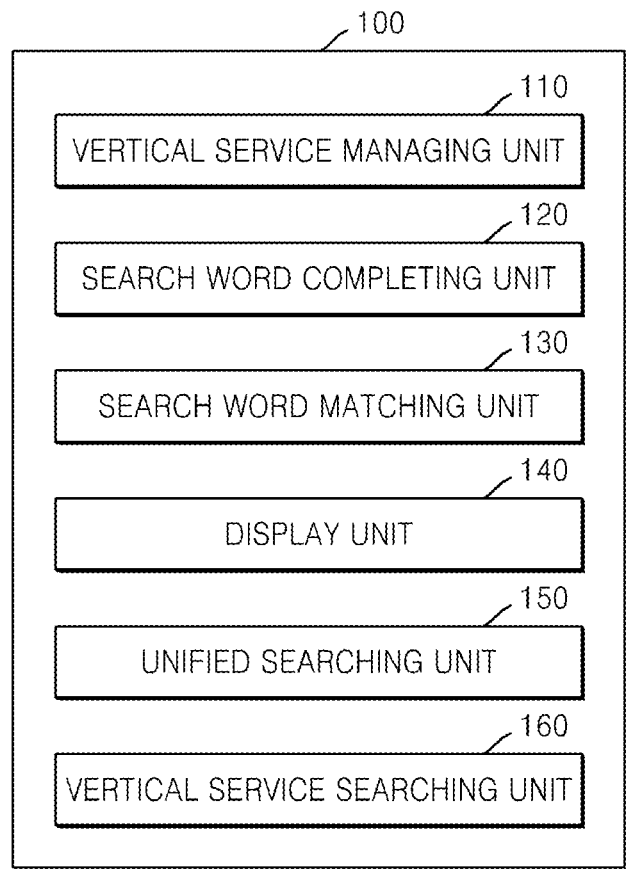
FIG. 4 is a block diagram of an internal structure of a service providing server according to at least one example embodiment.
FIG. 5 illustrates a search word table related to a vertical service, according to at least one example embodiment.

FIG. 4 is a block diagram of an internal structure of a service providing server 100 according to at least one example embodiment.

The service providing server 100 according to at least one example embodiment includes a vertical service managing unit 110, a search word completing unit 120, a search word matching unit 130, a display unit 140, a unified searching unit 150, and a vertical service searching unit 160. As is discussed above, according to one or more example embodiments, the service providing server 100 is as an electronic device having the structure and operations described above for the electronic device 50 with reference to FIG. 1B. Thus, according to one or more example embodiments, each of the vertical service managing unit 110, a search word completing unit 120, a search word matching unit 130, a display unit 140, a unified searching unit 150, and a vertical service searching unit 160, are embodied by the service providing server 100. For example, one or more units of program code may be stored in the memory unit 56 of the service providing server 100. Further, the one or more units of program code may include instructions for instructing a processor to execute the functions described herein with respect to the vertical service managing unit 110, search word completing unit 120, search word matching unit 130, display unit 140, unified searching unit 150, and vertical service searching unit 160, respectively. Further, the one or more units of code may be executed by the processing unit 58 of the service providing server 100 in order to achieve the functionality described herein with reference to the vertical service managing unit 110, search word completing unit 120, search word matching unit 130, display unit 140, unified searching unit 150, and vertical service searching unit 160, respectively.

First, the vertical service managing unit 110 receives, from the manager terminal 200, a list of vertical service, and manages the list of vertical services, contents to be included in the vertical services, and an assigned search word corresponding to each vertical service. In detail, the vertical service managing unit 110 may separately manage manager registration content with respect to a certain search word. Manager registration content with respect to a certain search word is content displayed most prominently when the certain search word is used while a section search is performed in a vertical service. The vertical service managing unit 100 may cause manager registration content to be displayed most prominently, for example, by causing the manager registration content to be displayed a high or highest position among other displayed content on a web page or UI representing results of a search, and/or using a different formatting for the manager registration content (e.g., coloring, borders, character type, character size, etc.) with respect to other content, in order to highlight the manager registration content and differentiate the manager registration content from other displayed content on a webpage representing results of a search. Manager registration content may be content arranged and registered by the manager terminal 200 with respect to a search word that is input many times by users.

For example, if 'Polo' is a certain search word in a car vertical service, manager registration content may include information that people who search cars may be expected to have an interest in, such as car models, fuel efficiencies, prices, and model release years. Manager registration content may be information stored in the service providing server 100, instead of information generally existing on web. Since a search intention of a user is relatively clear in a section search of a vertical service, manager registration content may be displayed more prominently than other information so as to information that is substantially, or alternatively the most, useful and reliable information about a certain search word.

In addition, the vertical service managing unit 110 may manage user contents that are registered by users by directly accessing a vertical service, and link contents about links of websites matching a vertical service from among other websites.

Also, the vertical service managing unit 110 may manage a table of assigned search words related to each vertical service.

As shown in FIG. 5, the vertical service managing unit 110 may receive first through third vertical services and assigned search words from the manager terminal 200, and store the first through third vertical services and the assigned search words as data. For example, for each vertical service, an assigned search word corresponding to the vertical service is a search word related to information that corresponds to a topic assigned to the vertical service. Consequently, a user may be more likely to use content of a vertical service when the assigned search word is input.

For example, the first vertical service may have a, b, and c as assigned search words, and manager registration content related to each assigned search word may be connected to the each assigned search word. For example, when the first vertical service is a car vertical service, the assigned search words a, b, and c may be, for example, different model names for cars, respectively.

The search word completing unit 120 determines at least one auto-complete search word corresponding to a search word input so far, upon receiving a search word from the user. The search word completing unit 120 may determine an auto-complete search word or phrase by receiving the search word in real-time. An auto-complete search word or phrase is a search word or phrase that is automatically completed based on currently input text, where the currently input text may be, for example, only portion of an auto-complete search word or phrase.

Referring to the basic screen shown in FIG. 3A, item (a), a search word may be input to the search window 321 in characters. For example, when 'Polo' is input to the search window 321, 'Polo kids' and 'Polo direct transaction website' may be determined as auto-complete search words.

Since the search word completing unit 120 determines an auto-complete search word in real-time, the auto-complete search word may be determined even when the user did not finish inputting the search word. For example, even when the user input 'Pol' to the search window 321, 'Polo', 'Polish', and 'Poly' may be determined as auto-complete search words, as will be discussed in greater detail below with reference to FIG. 6, item (a).

Also, the search word completing unit 120 may determine an input search word itself as an auto-complete search word. In addition, the search word completing unit 120 may prioritize auto-complete search words according to search frequencies of other users.

The search word matching unit 130 matches an auto-complete search word and a vertical service. In order to match an auto-complete search word and a vertical service, the search word matching unit 130 may use the search word table of FIG. 5. For example, when an auto-complete search word determined by an input search word is 'a', a vertical service having 'a' as an assigned search word is the first vertical service, and thus the search word matching unit 130 may match 'a' and the first vertical service. If an auto-complete search word does not match any of assigned search words, the search word matching unit 130 determines that the auto-complete search word does not have a matching vertical service.

For example, referring back to FIG. 5, when the assigned search word 'a' is 'Polo' and the first vertical service is a car vertical service, the auto-complete search word 'Polo' may be matched with the car vertical service.

In addition, the search word matching unit 130 may match one auto-complete search word with a plurality of vertical services. Referring to FIG. 5, the assigned search word 'a' is matched with the first vertical service and also with the third vertical service.

Figure 6:
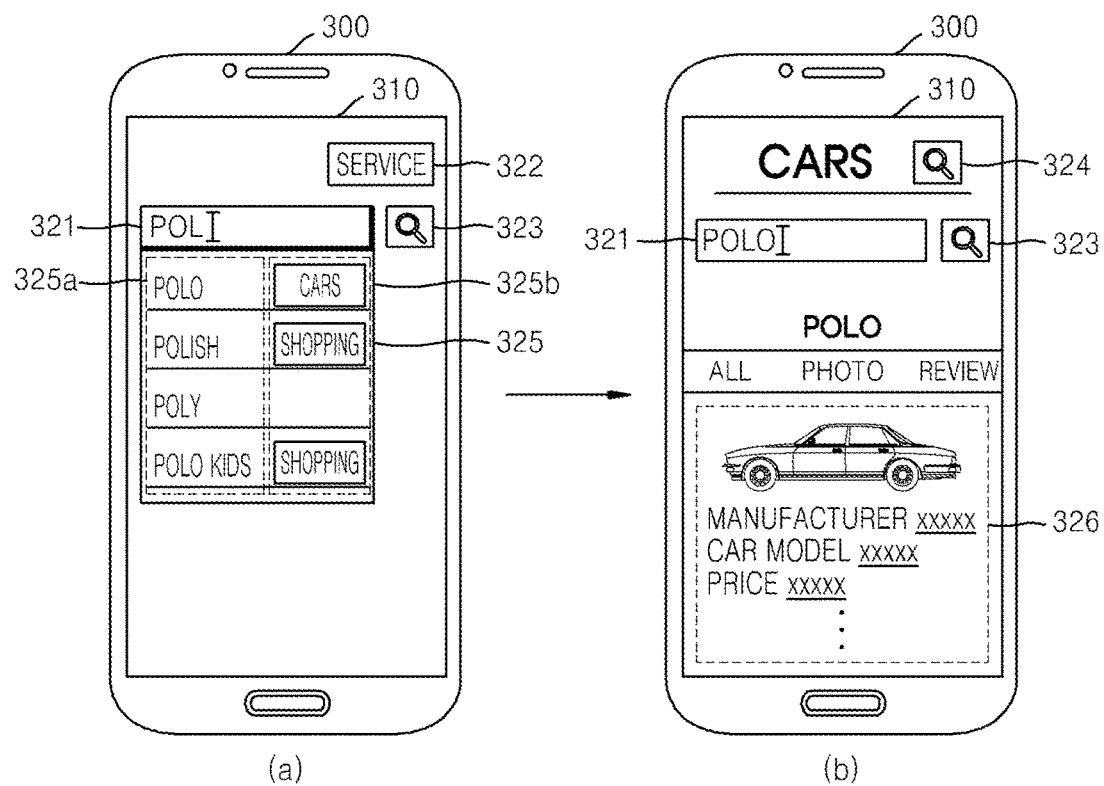
FIG. 6 is a diagram of an auto-complete search window according to at least one example embodiment.

Next, the display unit 140 displays an auto-complete search word and a vertical service icon. In detail, the display unit 140 display an auto-complete search window 325 that displays an auto-complete search word and a vertical service icon below the search window 321 as shown in FIG. 6. As used herein, descriptions of the display unit 140 'displaying' information may refer to the display unit 140 causing the user device 300 to display information, for example, on the display 310. For example, the display unit 140 may cause the user device 300 to display particular information by generating, at the service providing server 100, code defining a webpage for displaying the particular information, and sending the code defining the web page to the user device 300.

FIG. 6 is a diagram of the auto-complete search window 325 according to at least one example embodiment.

Referring to FIG. 6, item (a), when the user inputs a search word to the search window 321, the display unit 140 displays the auto-complete search window 325. The auto-complete search window 325 may display n rows, wherein n is a natural number and each row may include an auto-complete search word display region 325*a* and a vertical service icon display region 325*b*. In FIG. 6, item (a), the auto-complete search window 325 displays four rows.

The display unit 140 displays an auto-complete search word determined by the search word completing unit 120 according to a priority, on the auto-complete search word display region 325*a* of each row. For example, an auto-complete search word 'Polo' of a search word 'Pol' is displayed on the first row of the auto-complete search window 325. Alternatively, an auto-complete search word displayed on the first row of the auto-complete search window 325 may be a search word input so far.

Also, the display unit 140 displays a vertical service icon matching an auto-complete search word of each row in the vertical service icon display region 325*b*. For example, since a vertical service matching the auto-complete search word 'Polo' in FIG. 6 (a) is a car vertical service, an icon of the car vertical service is displayed in the vertical service icon display region 325*b* of the first row. Also, since a vertical service matching an auto-complete search word 'Polish' is a shopping vertical service, an icon of the shopping vertical service is displayed in the vertical service icon display region 325*b* of the second row.

The unified searching unit 150 performs a unified search on a search word input by the user. As shown in FIG. 3B (b), the unified search provides general website search results and search results with respect to vertical services related to the search word. Unified search results may be provided to the user when the user selects an auto-complete search word displayed in the auto-complete search word display region 325*a* from the auto-complete search window 325.

For example, referring to FIG. 6 (a), when the user selects 'Polo' from the auto-complete search window 325, the unified search results shown in FIG. 3B, item (b) may be provided to the user.

The vertical service searching unit 160 provides results of searching content of a vertical service for a search word. According to at least one example embodiment, the user may search content of a vertical service by selecting a vertical service icon displayed in the vertical service icon display region 325*b* of the auto-complete search window 325. Here, the content of the vertical service is searched by using an auto-complete search word on the same row as the selected vertical service icon. For example, referring to FIG. 6, item (a), when the icon of the car vertical service on the first row is selected, the user may obtain section search results of the car vertical service as shown in FIG. 6, item (b).

According to at least one example embodiment, vertical service search results of FIG. 6, item (b) may initially display manager registration content 326. As described above, the manager registration content 326 is content that is first displayed when a certain search word is input, and is registered by the manager after filtering.

The vertical service search results of FIG. 6, item (b) may be the same results as the search results of FIG. 3A, item (d). However, a number of mandatory user inputs may be reduced substantially in FIG. 6, item (b) compared to FIG. 3A, item (d). Accordingly, the user may directly move to a vertical service search result with respect to an auto-complete search word without a plurality of selections, and thus user convenience may increase.

Figure 7:
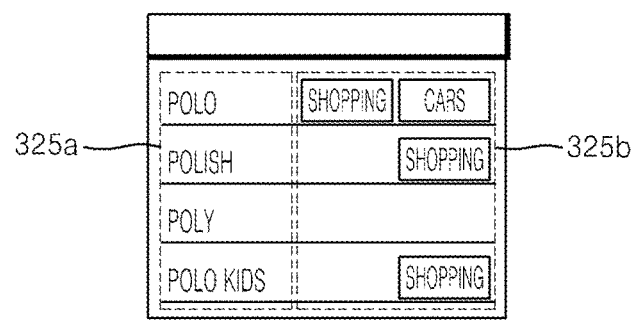
FIG. 7 is a diagram of an auto-complete search window according to one or more example embodiments.

FIG. 7 is a diagram of an auto-complete search window according to one or more example embodiments.

As shown in the search word table of FIG. 5, one assigned search word does not necessarily correspond to one vertical service. For example, the assigned search word 'a' may correspond to the first vertical service and the second vertical service.

In this case, the display unit 140 may display a plurality of vertical service icons on one row of the auto-complete search window. In other words, one auto-complete search word corresponds to one row of the auto-complete search window, but may correspond to a plurality of vertical service icons.

Figure 8:
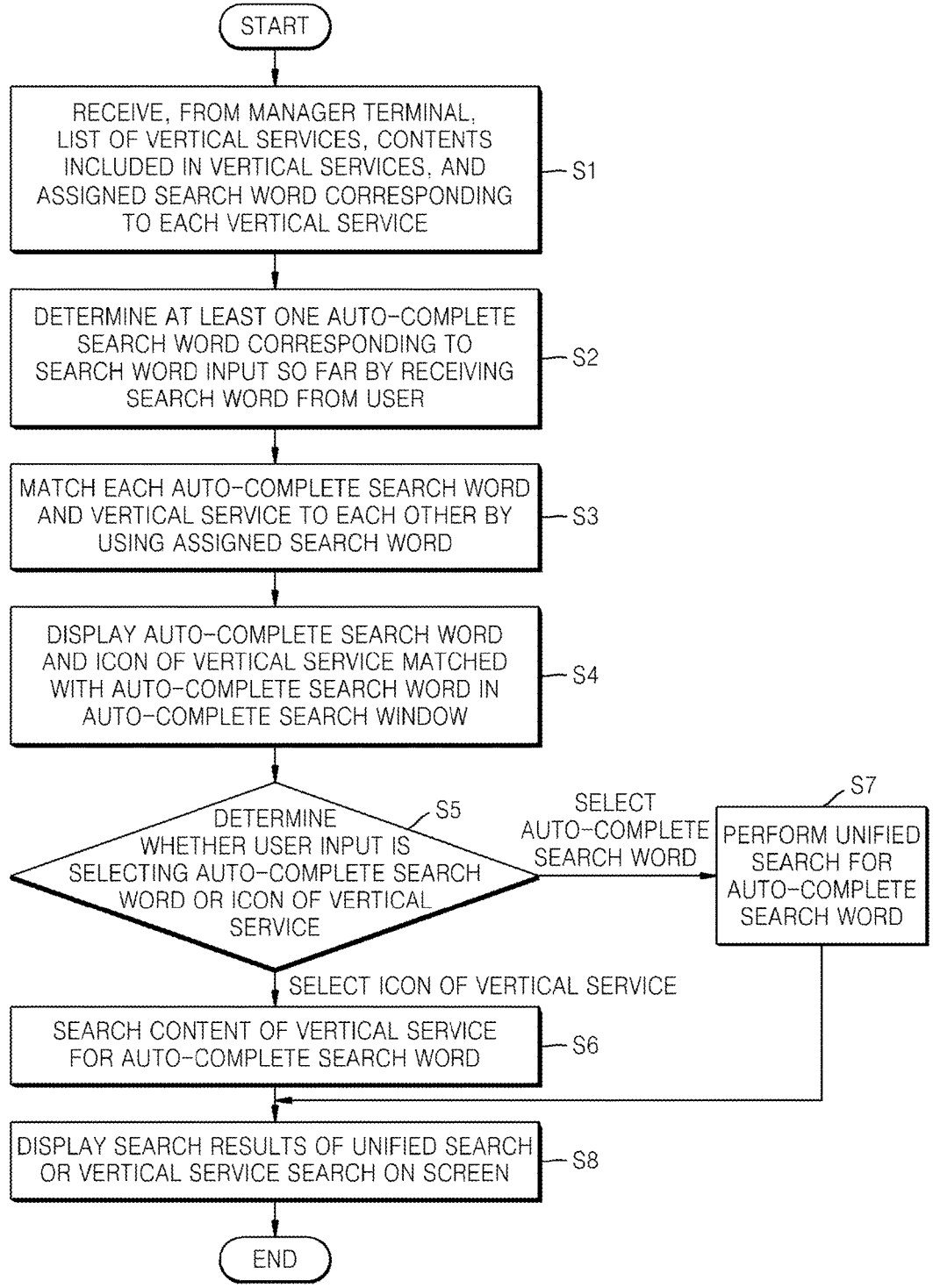
FIG. 8 is a flowchart of a search method according to at least one example embodiment.

FIG. 8 is a flowchart of a search method according to at least one example embodiment.

First, a list of vertical services, contents included in the vertical services, and an assigned search word corresponding to each vertical service are received, for example by the service providing server 100, from the manager terminal 200, in operation S 1.

Then, at least one auto-complete search word corresponding to a search word input so far is determined by receiving a search word from a user, in operation S2. The search word maybe received, for example, at the service providing server 100 from the user device 300 after being entered, at the user device 300, into webpage that was provided from the service providing server 100 to the user device 300.

Then, each auto-complete search word and a vertical service are matched to each other by using an assigned search word, in operation S3. For example, each auto-complete search word and a vertical service may be matched to each other by the service providing server 100.

Then, the auto-complete search word and an icon of the vertical service matched with the auto-complete search word are displayed in an auto-complete search window, in operation S4. For example, the display unit 140 of the service providing server 100 may display the auto-complete search word and an icon of the vertical service matched with the auto-complete search in an auto-complete search window.

Then, it is determined whether user input indicates selection of an auto-complete search word or an icon of a vertical service, in operation S5. For example, based on data entered by a user into the user device 300 and received at the service providing server 100 from the user device 300, the service providing server 100 may determine whether the data entered by the user indicates selection of an auto-complete search word or an icon of a vertical service.

If the icon of the vertical service is selected, content of the vertical service is searched for the auto-complete search word, in operation S6. For example, the service providing server 100 may search content of the vertical service, if the service providing server 100 determines in step S5 that the user input indicates selection of the vertical service.

If the auto-complete search word is selected, a unified search is performed for the auto-complete search word, in operation S7. For example, the service providing server 100 may perform a unified search for the auto-complete search word, if the service providing server 100 determines in step S5 that the user input indicates selection of the auto-complete search word.

Lastly, search results of the unified search or vertical service search are displayed on a screen in operation S8. For example, the display unit 140 of the service providing server 100 may display search results of the unified search or vertical service search.

As described above, according to one or more example embodiments, a method of searching content in a vertical service while reducing a number of input operations of a user may be provided.

According to one or more example embodiments, filtered vertical service content of a manager may be displayed as a search result in an upper rank.

According to one or more example embodiments, a search service specialized in a mobile environment may be provided.

The methods described above may be recorded on a computer readable recording medium by being realized in computer programs executed by using various computers. The computer readable recording medium may include at least one of a program command, a data file, and a data structure. The program commands recorded in the computer readable recording medium may be specially designed or well known to one of ordinary skill in the computer software field. Examples of the computer readable recording medium include read-only memory (ROM), random-access memory (RAM), CD-ROMs, magnetic tapes, floppy disks, optical data storage devices, etc. Examples of the computer command include mechanical codes prepared by a compiler, and high-level languages executable by a computer by using an interpreter. The hardware device may be configured to operate as at least one software module to perform operations of the methods, or vice versa.

The particular implementations shown and described herein are illustrative examples of example embodiments are not intended to otherwise limit the scope of example embodiments in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of example embodiments unless the element is specifically described as "essential" or "critical".

Example embodiments having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A search system for providing a vertical service connection, the search system comprising:
storage storing computer-executable instructions; and
one or more processors configured to execute the computer-executable instructions such that the one or more processors are configured to, determine, upon receiving a search word from a user terminal, at least one auto-complete search word corresponding to a currently input search word, match each auto-complete search word among the at least one auto-complete search word with a vertical service, cause an auto-complete search window having n rows to be displayed at one side of a search window, n a natural number greater than or equal to 2, cause the at least one auto-complete search word and a vertical service icon to be displayed such that, an auto-complete search word from among the at least one auto-complete search word is displayed at a first side of each of the n rows, and for each of the n rows, a vertical service icon corresponding to the vertical service matched with the auto-complete search word displayed at the first side of the row is displayed at a second side of the row;

provide, upon receiving an indication that a first vertical service icon is selected, first search results; and provide, upon receiving an indication that a first auto-complete search word is selected, second search results, the first vertical service icon being a vertical service icon displayed in a row from among the n rows of the auto-complete search window, the first auto-complete search word being the auto-complete search word displayed on the first side of the row in which the selected first vertical service icon is displayed, the first search results being results of searching content included in a vertical service corresponding to the selected first vertical service icon for the first auto-complete search word, the second search results being results of searching content for the first auto-complete search word, and the second search results being different than the first search results.

2. The search system of claim 1, wherein the one or more processors are configured to execute the computer-executable instructions such that the at least one auto-complete search word is at least two auto-complete search words, the at least two auto-complete search words include a first search word and a second search word different from the first search word, the first search word is displayed at the first side of at least one of the n rows, and the second search word is displayed at the first side of at least one of the n rows.

3. The search system of claim 2, wherein the one or more processors are configured to execute the computer-executable instructions such that the one or more processors are configured to, determine a priority of each of the at least two auto-complete search words in a descending order of search frequency, and display the at least two auto-complete search words on rows of the auto-complete search window according to the priorities such that a row upon which a search word, from among the at least two auto-complete search words, for which a high priority is determined is higher than a row upon which a search word, from among the at least two auto-complete search words, for which a low priority is determined is displayed.

4. The search system of claim 2, wherein the one or more processors are configured to execute the computer-executable instructions such that a number of vertical service icons displayed at the second side is at least one.

5. The search system of claim 2, wherein the one or more processors are configured to execute the computer-executable instructions such that an auto-complete search word displayed on a first row of the auto-complete search window is the currently input search word.

6. The search system of claim 1, wherein the one or more processors are configured to execute the computer-executable instructions such that the one or more processors are configured to match the at least one auto-complete search word with a vertical service having an assigned search word matching with the at least one auto-complete search word.

7. The search system of claim 1, wherein the one or more processors are configured to execute the computer-executable instructions such that the one or more processors are configured to, upon receiving an auto-complete search word selection, provide results of searching for the at least one auto-complete search word via a unified search.

8. The search system of claim 1, wherein the one or more processors are configured to execute the computer-executable instructions such that the one or more processors are configured to, receive a list of vertical services from a manager terminal, and manage the list of vertical services, contents included in the listed vertical services, and an assigned search words corresponding to each of the listed vertical services, respectively.

9. The search system of claim 8, wherein the one or more processors are configured to execute the computer-executable instructions such that the one or more processors are configured to provide search results by ranking manager registration content such that the manager registration content has higher priority compared to other content from among the contents included in the listed vertical services.

10. A search method of providing a vertical service connection, the search method comprising:

determining at least one auto-complete search word corresponding to a search word received from a user terminal;

matching each auto-complete search word among the at least one auto-complete search word with a vertical service;

causing an auto-complete search window having n rows to be displayed at one side of a search window, n a natural number greater than or equal to 2;

causing display of the at least one auto-complete search word and a vertical service icon to be displayed such that, an auto-complete search word from among the at least one auto-complete search word is displayed at a first side of each of the n rows, and for each of the n rows, a vertical service icon corresponding to the vertical service matched with the auto-complete search word displayed at the first side of the row is displayed at a second side of the row;

providing, upon receiving an indication that a first vertical service icon is selected, first search results; and providing, upon receiving an indication that a first auto-complete search word is selected, second search results, the first vertical service icon being a vertical service icon displayed in row from among the n rows of the auto-complete search window, the first auto-complete search word being the auto-complete search word displayed on the first side of the row in which the selected first vertical service icon is displayed, the first search results being results of searching content included in a vertical service corresponding to the selected first vertical service icon for the first auto-complete search word, the second search results being results of searching content for the first auto-complete search word, and the second search results being different than the first search results.

11. The search method of claim 10, wherein the at least one auto-complete search word is at least two auto-complete search words, the at least two auto-complete search words include a first search word and a second search word different from the first search word, the first search word is displayed at the first side of at least one of the n rows, and the second search word is displayed at the first side of at least one of the n rows.

12. The search method of claim 11, wherein the determining includes, determining a priority of each of the at least two auto-complete search words in a descending order of search frequency, and the displaying includes displaying the at least two auto-complete search words on rows of the auto-complete search window according to the priorities such that a row upon which a search word, from among the at least two auto-complete search words, for which a high priority is determined is higher than a row upon which a search word, from among the at least two auto-complete search words, for which a low priority is determined is displayed.

13. The search method of claim 11, wherein a number of vertical service icons displayed at the second side is at least one.

14. The search method of claim 11, wherein an auto-complete search word displayed on a first row of the auto-complete search window is a currently input search word.

15. The search method of claim 10, wherein the matching comprises:

matching the at least one auto-complete search word with a vertical service having an assigned search word matching with the at least one auto-complete search word.

16. The search method of claim 10, further comprising:

upon receiving an indication of a selection of the auto-complete search word, providing results of searching for the at least one auto-complete search word via a unified search.

17. The search method of claim 10, further comprising:

receiving a list of vertical services from a manager terminal; and managing the list of vertical services, contents included in the listed vertical services, and assigned search words corresponding to each of the listed vertical services, respectively.

18. The search method of claim 17, wherein the providing comprises:

providing search results by ranking manager registration content such that the manager registration content has higher priority compared to other content from among the contents included in the listed vertical services.

19. A non-transitory computer-readable recording medium having recorded thereon a program including instructions that, when executed by a processor, cause the processor to perform search operations, the operations comprising:

determining at least one auto-complete search word corresponding to a search word received from a user terminal;

matching each search word among the at least one auto-complete search word with a vertical service;

causing an auto-complete search window having n rows to be displayed at one side of a search window, n a natural number greater than or equal to 2, causing display of the at least one auto-complete search word and a vertical service icon to be displayed such that, an auto-complete search word from among the at least one auto-complete search word is displayed at a first side of each of the n rows, and for each of the n rows, a vertical service icon corresponding to the vertical service matched with the auto-complete search word displayed at the first side of the row is displayed at a second side of the row;

providing, upon receiving an indication that a first vertical service icon is selected, first search results; and providing, upon receiving an indication that a first auto-complete search word is selected, second search results, the first vertical service icon being a vertical service icon displayed in a row from among the n rows of the auto-complete search window,.

the first auto-complete search word being the auto-complete search word displayed on the first side of the row in which the selected first vertical service icon is displayed, the first search results being results of searching content included in a vertical service corresponding to the selected first vertical service icon for the first auto-complete search word, the second search results being results of searching content for the first auto-complete search word, and the second search results being different than the first search results.

20. A search device comprising:

a processing unit, the processing unit including a processor, the processing unit being configured to, receive search text from a user device;

determine at least one auto-complete search word corresponding to the received search text;

select one or more vertical services from among a plurality of vertical services, the selected one or more vertical services being vertical services that correspond to the at least one auto-complete search word;

cause an auto-complete search window having n rows to be displayed at one side of a search window, n a natural number greater than or equal to 2;

cause the user device to display the at least one auto-complete search word and one or more vertical service icons, the one or more vertical service icons corresponding, respectively, to the selected one or more vertical services, such that, an auto-complete search word from among the at least one auto-complete search word is displayed at a first side of each of the n rows, and for each of the n rows, at least one vertical service icon corresponding to at least one of the one or more vertical services that correspond to the auto-complete search word displayed at the first side of the row is displayed at a second side of the row., provide, upon receiving an indication that a first vertical service icon is selected, first search results; and provide, upon receiving an indication that a first auto-complete search word is selected, second search results, the first vertical service icon being a vertical service icon displayed in a row from among the n rows of the auto-complete search window, the first auto-complete search word being the auto-complete search word displayed on the first side of the row in which the selected first vertical service icon is displayed, the first search results being results of searching content included in a vertical service corresponding to the selected first vertical service icon for the first auto-complete search word, the second search results being results of searching content for the first auto-complete search word, and the second search results being different than the first search results.

* * * * *